United States Patent [19]

Warner

[11] Patent Number: 4,923,549
[45] Date of Patent: May 8, 1990

[54] METHOD OF MAKING A MULTILAYER POLYMERIC FILM HAVING DEAD BEND CHARACTERISTICS

[75] Inventor: Steven B. Warner, Acworth, Ga.

[73] Assignee: Kimberly-Clark Corporation, Neenah, Wis.

[21] Appl. No.: 374,686

[22] Filed: Jun. 30, 1989

Related U.S. Application Data

[62] Division of Ser. No. 115,132, Oct. 30, 1987, Pat. No. 4,882,230.

[51] Int. Cl.$^5$ .............................................. B32B 31/08
[52] U.S. Cl. ................. 156/229; 156/308.2; 156/308.6; 156/312; 156/334; 264/147; 264/229
[58] Field of Search ............... 428/35, 516, 910, 34.7, 428/212; 264/147, 229, 210.8; 156/160, 163, 164, 229, 308.2, 308.6, 309.6, 312, 324.4, 334, 494–496, 538, 543, 547

[56] References Cited

U.S. PATENT DOCUMENTS

| | | | |
|---|---|---|---|
| 3,017,302 | 1/1962 | Hult Krans | 156/229 |
| 3,342,657 | 9/1967 | Dyer | 156/229 |
| 3,380,868 | 4/1968 | Moser | 156/229 |
| 3,539,439 | 11/1970 | Calderwood | 156/229 |
| 3,547,768 | 12/1970 | Layne | 156/229 |
| 3,671,542 | 6/1972 | Kwolek | 264/210.8 |
| 4,022,646 | 5/1977 | Casey | 156/229 |
| 4,039,364 | 8/1977 | Rasmussen | 156/229 |
| 4,053,270 | 10/1977 | Collier | 425/144 |
| 4,067,852 | 1/1978 | Calundann | 528/190 |
| 4,118,372 | 10/1978 | Schaetgen | 528/190 |
| 4,181,792 | 1/1980 | Jackson | 528/190 |
| 4,228,118 | 10/1980 | Wu | 264/210.8 |
| 4,337,285 | 6/1982 | Akao | 156/229 |
| 4,352,849 | 10/1982 | Mueller | 428/213 |
| 4,356,138 | 10/1982 | Kauesh | 264/210.8 |
| 4,374,690 | 2/1983 | Canterino | 156/229 |
| 4,386,124 | 5/1983 | Akao | 428/35.3 |
| 4,413,110 | 11/1983 | Kauesh | 264/210.8 |
| 4,539,259 | 9/1985 | Zuscik | 428/332 |
| 4,595,620 | 6/1986 | Dighton | 428/34.5 |

*Primary Examiner*—Merrell C. Cashion, Jr.
*Attorney, Agent, or Firm*—William E. Maycock

[57] ABSTRACT

A multilayer polymeric film having dead bend characteristics which are substantially planar isotropic is a laminate of at least two layers of one or more polymeric films, in which:

A. each polymeric film layer is highly oriented in one direction, such that each polymeric film layer has dead bend properties with respect to bending deformations substantially normal to the direction of orientation; and B. the direction of orientation of each polymeric film layer forms an angle of at least about 30 degrees with the direction of orientation of each adjacent polymeric film layer.

A method for making the multilayer polymeric film having dead bend characteristics also is provided.

15 Claims, 1 Drawing Sheet

METHOD OF MAKING A MULTILAYER POLYMERIC FILM HAVING DEAD BEND CHARACTERISTICS

This is a division of application Ser. No. 07/115,132, filed on Oct. 30, 1987, now U.S. Pat. No. 4,882,230.

BACKGROUND OF THE INVENTION

The present invention relates to a multilayer polymeric film having dead bend characteristics. More particularly, the present invention relates to a multilayer polymeric film comprising at least two layers of one or more polymeric films, each of which is highly oriented uniaxially. Such multilayer polymeric film possesses dead bend characteristics regardless of the direction of the fold in the plane of the film.

In general, food wraps (used herein to refer only to sheet goods, thereby excluding closable bags and similar containers) are of three general types: aluminum foil, waxed paper, and clear plastic (e.g., thermoplastic polymer) films. Waxed paper must be taped or otherwise restrained in a closed condition. Plastic films generally remain closed to a greater or lesser extent because of the tendency of the film to adhere weakly to itself and, in some instances, to a container. Of the three types of wraps, only aluminum foil remains in a closed condition because it possesses dead bend characteristics. However, only the plastic films are transparent, an obviously desirable feature.

As used herein, the term "dead bend" refers to the ability of a film to remain in a deformed state, which ability results from the lack of elastic or viscoelastic recovery from deformation. The deformation encountered in the use of a food wrap typically is bending and rarely tensile.

To obtain a dead bend plastic or polymeric film, it is postulated that the elastic limit of the polymer must be lowered approximately one order of magnitude and that time dependent relaxation must be essentially eliminated. It further is postulated that such goals perhaps can be achieved by preparing films from highly oriented polymers. However, films prepared from highly oriented polymers typically fibrillate readily in the direction of orientation.

Highly oriented films and fibers are, of course, well known. In many cases, the high degree of orientation is achieved by stretching the material to a draw ratio of the order of about 20 or, in some cases, higher. By way of illustration, a number of representative references are described in the paragraphs which follow.

The preparation of high-strength polyethylene continuous filaments is described by W. Wu and W. B. Black, *Polm. Eng. Sci.*, 19, 1163 (1979). Six high density polyethylenes were employed in the study. In some cases, draw ratios as high as about 32 were possible. Reportedly, fibers with high breaking strength as well as high Young's modulus were made from polymers having a number average molecular weight greater than 22,000 by way of a spinning and drawing process which met the following criteria: (a) an extrusion temperature above 250 degrees C; (b) quenching of the molten filament in air under a certain amount of tension; and (c) a drawing temperature from 120 to 130 degrees C.

Morphology and tensile property relations of high-strength/high-modulus polyethylene fibers are described by W. Wu et al., *J. Polym. Sci., Polym. Phys. Ed.*, 18, 751 (1980). The fibers studied apparently were prepared by high-temperature extrusion followed by hot drawing at draw ratios up to 25. The study also included the use of different types of polyethylene.

A high-modulus shaped article is described in British Provisional Specification, Application No. 9796/1974, filed Mar. 5, 1974 on behalf of G. Capaccio and I. M. Ward, which article may be obtained by subjecting a crystallizable, essentially linear organic polymer having a selected molecular weight distribution to a controlled thermal treatment whereby substantially complete alignment of its molecules is obtained when the polymer undergoes attenuation at an imposed rate and temperature. Suitable treatments are stated to involve (1) slowly cooling the polymer from a temperature close to its melting point, optionally quenching the polymer; (2) quickly cooling the polymer and then holding it at a fixed temperature for a period of time to allow crystallization to occur, optionally followed by quenching; or (3) very rapidly cooling the polymer to a temperature where crystallization occurs only very slowly, optionally followed by reheating. The acceptable rates of cooling in (1), (2), and (3) and the time and temperature in (2) depend upon the type of polymer used and its molecular weight. In the examples, draw ratios ranged from 12 to 54.

The above reference appears to be but one example of a continuing research effort by Giancarlo Capaccio and/or Ian MacMillan Ward, often with coworkers, relating to high-strength fibers and films. See also, by way of illustration: G. Capaccio and I. M. Ward, *Nature (London), Phys. Sci.*, 243, 143 (1973) [*Chem. Abstr.*, 79:79380m (1973)]; G. Capaccio and I. M. Ward, *Polymer*, 15, 233 (1974) [*Chem. Abstr.*, 81:121128d (1974)]; German Offenlegungschrift No. 2,410,747, filed Sept. 12, 1974 on behalf of I. M. Ward and G. Capaccio [*Chem. Abstr.*, 82:P17519s (1975)]; French Demande No. 2,234,982, filed Jan. 24, 1975 on behalf of I. M. Ward and A. G. Gibson [*Chem. Abstr.*, 83:P98428g (1975)]; G. Capaccio and I. M. Ward, *Polymer*, 16, 239 (1975) [*Chem. Abstr.*, 83:115135d (1975)]; G. Capaccio et al., *Polymer*, 16, 469 (1975) [*Chem. Abstr.*, 83:147892q (1975)]; G. Capaccio and I. M. Ward, *Poly. Eng. Sci.*, 15, 219 (1975) [*Chem. Abstr.*, 83:28932t (1975)]; G. Capaccio et al., *J. Polym. Sci., Polym. Phys. Ed.*, 14, 1641 (1976) [*Chem. Abstr.*, 85:160721u (1976)]; G. Capaccio et al., *Polymer*, 17, 644 (1976) [*Chem. Abstr.*, 85:178100a (1976)]; French Demande No. 2,330,716, filed June 3, 1977 on behalf of G. Capaccio and I. M. Ward [*Chem. Abstr.*, 88:P51539g (1978)]; G. Capaccio and I. M. Ward, *Polymer*, 18, 967 (1977) [*Chem. Abstr.*, 88:170596h (1978)]; British Patent No. 1,498,628, issued on Jan. 25, 1978 and filed on Oct. 3, 1973 on behalf of G. Capaccio and I. M. Ward [*Chem. Abstr.*, 89:90786a (1978)]; G. Capaccio et al., *Polym. Eng. Sci.*, 18, 533 (1978) [*Chem. Abstr.*, 88:170918q (1978)]; G. Capaccio et al., *Ultra-High Modulus Polym.*, [*Lect. Semin.*], 1977 (Published 1979) [*Chem. Abstr.*, 92:59818a (1980)]; G. Capaccio et al., *J. Polym. Sci., Polym. Phys. Ed.*, 18, 301 (1980) [*Chem. Abstr.*, 92:129782k (1980)]; G. Capaccio, *Atti Conv.-Sc. Crist. Polim.*, 1979, 260 [*Chem. Abstr.*, 95:62903s (1981)]; G. Capaccio et al., *J. Polym. Sci., Polym. Phys. Ed.*, '19, 1435 (1981) [*Chem. Abstr.*, 95:133551p (1981)]; and G. Capaccio, *Macromol. Chem. Phys., Suppl.*, 4, 197 (1981) [*Chem. Abstr.*, 94:157319z (1981)].

U.S. Pat. No. 4,053,270 to J. R. Collier and T. Y. T. Tam describes an apparatus for the extrusion of highly oriented polymeric materials. The apparatus appears to be generally conventional, except that the axial orifices extending through the extrusion die are longer than those of conventional dies. The longer length orifices reportedly induce molecular orientation in the direction of flow within the molten polymeric material being extruded therethrough. Temperature control of the system is reported to be critical.

A process for producing high tenacity polyethylene fibers is reported in U.S. Pat. No. 4,228,118 to W. Wu and W. B. Black and appears to be based upon the work described in Wu and Black, supra. According to the patent, polyethylene yarns having tenacities of at least 12 grams per denier are produced at commercially feasible spinning speeds by a process in which a high density polyethylene having a number average molecular weight of at least 20,000 and a weight average molecular weight of less than 125,000 is extruded through a spinneret at a temperature of from 220 to 335 degrees C to form yarns which are hot-drawn at a temperature between about 115 and 132 degrees C. Draw ratios of from about 20 to about 35 or higher apparently can be employed.

Of course, a high degree of orientation in fibers and films can be achieved by means other than stretching already formed, solidified materials. For example, one class of highly oriented substances consists of liquid crystals which may be polymeric. See, e.g., Martin Grayson, Executive Editor, "Kirk-Othmer Encyclopedia of Chemical Technology," Third Edition, Vol. 14, John Wiley & Sons, New York, 1981, pp. 395–427; W. J. Jackson and H. F. Kuhfuss, *J. Polym. Sci., Polym. Chem.*, 14, 2043 (1976); U.S. Pat. No. 3,671,542 to S. L. Kwolek; U.S. Pat. No. 4,067,852 to G. W. Calundann; U.S. Pat. No. 4,118,372 to J. R. Schaefgen; and U.S. Pat. No. 4,181,792 to W. J. Jackson and H. F. Kuhfuss.

Other methods for obtaining highly oriented fibers and films include gel-drawing and hydrostatic extrusion; see, by way of illustration only, P. Smith and P. J. Lemstra, *Makromol. Chem.*, 180, 2983 (1979) and *Polymer*, 21, 1341 (1980); U.S. Pat. No. 4,356,138 to S. Kavesh et al.; J. H. Southern and R. S. Porter, *J. Appl. Polym. Sci.*, 14, 2305 (1970); and E. S. Clark and L. S. Scott, *Polym. Eng. Sci.*, 14, 682 (1974).

As an example of gel-drawing, U.S. Pat. No. 4,413,110 to S. Kavesh and D. C. Prevorcek may be mentioned. This patent describes high tenacity, high modulus polyethylene and polypropylene fibers and intermediates thereof. Solutions of ultrahigh molecular weight polymers such as polyethylene in a relatively nonvolatile solvent are extruded through an aperture, at constant concentration through the aperture, and cooled to form a first gel of indefinite length. The first gel is extracted with a volatile solvent to form a second gel and the second gel is dried to form a low porosity xerogel. The first gel, second gel, or xerogel, or a combination thereof, then are stretched. In the examples, stretching was accomplished at draw ratios up to about 175.

Multilayer films, of course, are well known. For a general discussion of some physical properties of such films, see, by way of illustration only, W. J. Schrenk and T. Alfrey, Jr., *Polym. Eng. Sci.*, 9, 393 (1969). Several somewhat more specific references are described briefly below.

U.S. Pat. No. 3,017,302 to P. B. Hultkrans describes improvements in the use of composite heat-shrinkable wrappers for packaging commodities. The wrapper apparently consists of a layer of a heat-shrinkable film, such as a polyester which has been stretch oriented to render it heat shrinkable, and either a second film laminated thereto or a coating thereon, which second film or coating consists of a thermoplastic material which is heat sealable, such as polyethylene.

U.S. Pat. No. 3,342,657 to G. B. Dyer relates to a process and apparatus for producing a laminated oriented thermoplastic film. The process comprises extruding a tube of thermoplastic material in its formative state, passing the tube over a cooled internal mandrel to cool the tube to a temperature which is below the temperature of the thermoplastic material in its formative state, maintaining sufficient pressure within the tube to at least prevent collapse of the tube, advancing the tube at a predetermined initial rate, heating the tube to the orientation temperature range by passing the tube over a heated internal mandrel, pulling the tube at a rate of from 2 to 5.5 times the initial rate to longitudinally uniaxially orient the tube, and cooling the tube to a temperature which is below the temperature of the material in the formative state by passing the tube about a cooled mandrel. If desired, the tube can be extruded from a rotating annular die and the extruded tube rotated throughout the remainder of the process, followed by slitting the rotating tube to strip form along substantially helical lines after the orientation and cooling steps to give a uniaxially oriented continuous strip. Subsequent stretching of the strip will yield a biaxially oriented film. Two such uniaxially oriented strips can be laminated together in such a way that the direction of orientation of one strip is substantially at right angles to the direction of orientation of the other strip.

A method for producing and orienting polypropylene films is described in U.S. Pat. No. 3,380,868 to R. Moser. Briefly, two or more unoriented polypropylene films having thicknesses of less than about 10 mils (about 250 microns) are secured together by bringing the films into intimate contact while simultaneously heating them at a temperature sufficient to promote good surface contact. The resulting film structure then is oriented, preferably by stretching first in a longitudinal direction and then in a transverse direction, optionally followed by another stretching in the longitudinal direction. Draw ratios apparently are in the range of from about 0.2 to 3.

U.S. Pat. No. 3,539,439 to G. C. Calderwood and D. Poller relates to polyolefin laminates which are heat sealable. According to the patent, polypropylene or ethylene-propylene copolymers can be processed to form heat-sealable films. Such films are formed by extruding or casting predominantly crystalline polymer into sheet stock of suitable thickness. The cast polymer then is extrusion coated with a polymer of a free-radical polymerizable monomer, the polymer having a lower softening temperature than the sheet stock polymer. The sheet stock may be coated on one or both sides. The coated sheet stock then is biaxially oriented by stretching laterally and longitudinally at draw ratios of from about 4 to about 8.

U.S. Pat. No. 3,547,768 to R. E. Layne describes a heat-shrinkable laminate. The laminate is stated to comprise two webs of plastic film having a very thin layer of barrier wax distributed therebetween. The laminate is produced by integrating laminating and stretching operations in such a manner that a layer of molten barrier wax is disposed between two films which then are stretched while the wax is in the molten condition. Although the plastic films can be made from a variety of polymers, the preferred polymer apparently is poly(vinyl chloride).

U.S. Pat. No. 4,022,646 to K. Casey describes a process for the co-orientation lamination of ethylene polymer films. The process comprises the steps of (1) bringing together in face-to-face engagement at least one ethylene polymer film (A) with at least one ethylene polymer film (B) and (2) while maintaining the films in face-to-face engagement, orienting the films at a temperature below the melting point of the polymer of film (A), the polymer of film (A) being of higher melting point than the polymer of film (B). Orientation apparently is carried out uniaxially at draw ratios of from 1.5 to 7.

A method for producing a laminated high-strength sheet is described by U.S. Pat. No. 4,039,364 to O. Rasmussen. According to the patent, the method comprises the steps of attenuating while extruding each of at least two layers of at least one molten polymer blend to impart to the polymer a unidirectional grain with a pronounced direction of splittability when solidified, before or after solidification of said layers uniting the layers into a common sheet with the grain direction of adjacent layers therein extending in criss-crossing relationship, while forming a generally weak bond between said layers, solidifying said layers if not already solid, and finally biaxially orienting the solid laminated sheet thus obtained in several steps which each are generally substantially uniaxial at a temperature sufficiently low for maintaining a significant splittability in each layer. In order to allow a local delamination during tearing and thereby make the tear "fork", it is essential to form a generally weak bond in the lamination of the layers. Stretch ratios appear to be less than 3.

U.S. Pat. No. 4,337,285 to M. Akao and K. Kashiwagi describes a wrapping material for light-sensitive materials. The material is obtained by bonding at least two uniaxially drawn films composed of high density polyethylene having a density of at least 0.94 g/cm$^3$ with an adhesive layer containing an aluminum paste or an aluminum powder so that the drawing axes thereof cross each other at an angle of from 45 to 90 degrees. Draw ratios can range from 2 to 6.

A coextruded, heat-shrinkable, multilayer polyolefin packaging film is the subject of U.S. Pat. No. 4,352,849 to W. B. Mueller. The film comprises an ethylene-vinyl acetate copolymer layer sandwiched between two layers of a copolymer of propylene. The multilayer film is oriented so that it is heat shrinkable in at least one direction, the preferred stretching ratios being from 4 to 7 in each of the transverse and longitudinal directions.

Finally, U.S. Pat. No. 4,374,690 to P. J. Canterino and C. E. Allen describes multidirectionally oriented films. The multidirectional orientation is achieved by using grooved rollers which impart a random orientation to the film as it passes between such grooved rollers, with the path of orientation varying sinusoidally. The random orientation of the film is directly related to the roller diameter and the helical angle, i.e., the angle between the axis of the groove and the axis of the roller. Two films having such multidirectional orientation can be laminated together for increased strength, tear resistance, and stiffness. While not mentioned, draw ratios inherently must be low.

In spite of all of the work with highly oriented fibers and films and the efforts directed at providing improved plastic or polymeric wrapping materials, there clearly is a need for a food wrap which combines the most desirable properties of plastic or polymeric films and aluminum foil, i.e., a clear or translucent plastic or polymeric food wrap which exhibits dead bend characteristics. Such a wrap can be used in microwave ovens, whereas aluminum foil cannot. Furthermore, many polymeric films exhibit excellent barrier properties.

SUMMARY OF THE INVENTION

It therefore is an object of the present invention to provide a multilayer polymeric film.

A further object of the present invention is to provide a multilayer polymeric film which exhibits dead bend characteristics.

An additional object of the present invention is to provide a multilayer polymeric film which exhibits dead bend characteristics which are substantially planar isotropic.

Another object of the present invention is to provide a clear or translucent multilayer polymeric film which exhibits dead bend characteristics.

Yet another object of the present invention is to provide a multilayer polymeric film comprising at least two layers of one or more polymeric films, each of which is highly oriented in one direction.

These and other objects will be apparent to one having ordinary skill in the art from a reading of the specification and claims which follow.

Accordingly, the present invention provides a multilayer polymeric film having dead bend characteristics which are substantially planar isotropic which comprises a laminate of at least two layers of one or more polymeric films, in which:

A. each polymeric film layer is highly oriented in one direction, such that each polymeric film layer has dead bend characteristics with respect to bending deformations substantially normal to the direction of orientation; and B. the direction of orientation of each polymeric film layer forms an angle of at least about 30 degrees with the direction of orientation of each adjacent polymeric film layer.

In preferred embodiments, each polymeric film layer is composed of a polyethylene. In other preferred embodiments, the multilayer polymeric film consists of two polymeric film layers which are composed of a polyethylene. In still other preferred embodiments, the direction of orientation of each polymeric film layer forms an angle of at least about 45 degrees with the direction of orientation of each adjacent polymeric film layer. In yet other preferred embodiments, the direction of orientation of each polymeric film layer forms an angle of at least about 60 degrees with the direction of orientation of each adjacent polymeric film layer.

The present invention also provides a method of making a multilayer polymeric film having dead bend characteristics which are substantially planar isotropic which comprises the steps:

A. forming a first polymeric film from a first thermoplastic polymer;

B. uniaxially orienting said first polymeric film by stretching the film to a draw ratio of at least about 20;

C. forming a second polymeric film from a second thermoplastic polymer;

D. uniaxially orienting said second polymeric film by stretching the film to a draw ratio of at least about 20; and E. laminating said uniaxially oriented first polymeric film to said uniaxially oriented second polymeric film with the direction of orientation of said uniaxially oriented first polymeric film forming an angle of at least about 30 degrees with the direction of orientation of said uniaxially oriented second polymeric film to give a multilayer polymeric film having dead bend characteristics which are substantially planar isotropic.

In preferred embodiments, the first and second thermoplastic polymers are a polyethylene. In other preferred embodiments, the direction of orientation of said uniaxially oriented first polymeric film forms an angle of at least about 45 degrees with the direction of orientation of said uniaxially oriented second polymeric film. In yet other preferred embodiments, the direction of orientation of said uniaxially oriented first polymeric film forms an angle of at least about 60 degrees with the direction of orientation of said uniaxially oriented second polymeric film.

DETAILED DESCRIPTION OF THE INVENTION

As already noted, the term "dead bend" refers to the ability of a film to remain in a deformed state, which ability results from the lack of elastic or viscoelastic recovery from deformation.

As used herein, the term "substantially planar isotropic" means that the dead bend characteristics in the plane of the film are substantially independent of the direction of the deformation.

Additionally, the terms "plastic", "polymeric", and the like are used synonymously herein to simply indicate that the structure, typically a film, is composed of a polymeric substance which usually is synthetic. The use of one term or another is not intended to have any significance with respect to the scope of the present invention. By way of illustration, the term "plastic" often is used by those having ordinary skill in the art to mean thermoplastic or thermosetting synthetic polymers. The use of that term in this specification, however, is not to be so limited.

Based on preliminary work, compressive or bending deformations in highly drawn polyethylene become nonrecoverable or inelastic at a critical strain to buckle value of about 0.3 percent. Shear banding is visible optically, which requires at least some cooperative interaction among oriented molecules. Consequently, the criteria for dead bending using critical strain and fibril dimensions were examined.

Following Euler's formulation, the critical load to buckle a fibril can be expressed as follows since buckling is initiated when the Euler load is exceeded:

$$P_{cr} = \pi^2 EI/L^2, \text{ where} \tag{1}$$

$P_{cr}$ is the critical load, $L$ is the fibril column height, and $EI$ is the flexural rigidity of the fibril.

Because $$P_{cr} = E\epsilon_{cr}A, \text{ where} \tag{2}$$

$\epsilon_{cr}$ is the critical strain to buckle and $A$ is the fibril cross-sectional area, equations (1) and (2) may be equated to give equation (3).

$$E\epsilon_{cr}A = \pi^2 EI/L^2 \tag{3}$$

Solving equation (3) for $\epsilon_{cr}$ results in equation (4).

$$\epsilon_{cr} = \pi^2 I/AL^2 \tag{4}$$

For a cylindrically shaped fibril, $$I = \pi r^4/4 \text{ and} \tag{5}$$

$$A = \pi r^2. \tag{6}$$

Thus, $$\epsilon_{cr} = f(\pi^2 r^2/4L^2), \text{ where} \tag{7}$$

$r$ is the fibril radius, $L$ is the fibril length, and $f$ is a reinforcement term.

Although fibril diameters can be estimated by means of scanning or transmission electron microscopy and small angle X-ray scattering, it is exceedingly difficult to accurately determine either L or f.

The parameter f is a measure of fibril reinforcement provided by neighboring fibrils. Such reinforcement may be either mechanical or chemical in nature. However, for many highly oriented polymers, f may be assumed to be 1.

If the fibril radius is assumed to be about 3,000 Angstroms and that value is substituted into equation (7), the following result is obtained:

$$\epsilon_{cr} = 7f/L^2, \text{ where} \tag{8}$$

$f$ is dimensionless and $L$ is in micrometers.

Substituting the average measured value of critical strain for films having dead bend characteristics, i.e., 0.004, and approximating f as unity, equation (8) can be solved for L:

$$L = (\pi r \epsilon_{cr}^{-\frac{1}{2}})/2 \text{ or} \tag{9}$$

$$= 7.5 \text{ micrometers.}$$

This value is low when compared to estimates of fibril length from scanning electron micrographs; however, this may be because the foregoing analysis assumed that the fibrils were uniform, straight, unreinforced columns.

Interestingly, such analysis suggests that the dead bend characteristic is independent of both the polymer type and the modulus of the film. That is, the critical strain to buckle is dependent only upon the presence of well-defined fibrils having little lateral interaction. Moreover, the critical strain value is inversely proportional to fibril length and directly proportional to fibril diameter. Stated differently, as the fibril length approaches infinity and fibril diameter approaches zero, the critical strain to buckle value also approaches zero. As already noted, very low critical strain values result in dead bend characteristics.

Consequently, the multilayer polymeric film of the present invention can be defined in terms of fibril dimensions. Thus, each polymeric film layer of the multilayer polymeric film of the present invention should be composed substantially of polymer fibrils having an average length of at least about 5 micrometers and an average diameter of less than about 0.5 micrometers, with the direction of orientation of the fibrils in one layer being at an angle of at least about 30 degrees from the direction of orientation of the fibrils of an adjacent layer. Preferably, the average fibril length will be at least about 10 micrometers and the average fibril diameter will be less than about 0.3 micrometers. Preferably, such angle will be at least about 45 degrees and most preferably at least about 60 degrees.

Because of the already noted difficulties associated with accurately measuring fibril dimensions, it is necessary to also define the invention functionally. Thus, the present invention can be defined as a multilayer polymeric film having dead bend characteristics which are substantially planar isotropic which comprises a laminate of at least two layers of a polymeric film, in which:

A. each polymeric film layer is highly oriented in the longitudinal direction, such that each polymeric film layer has dead bend properties with respect to bending deformations substantially normal to the direction of orientation; and B. the direction of orientation of each polymeric film layer forms an angle of least about 30 degrees with the direction of orientation of each adjacent polymeric film layer.

Preferably, the direction of orientation of each polymeric film layer forms an angle of at least about 45 degrees with the direction of orientation of each adjacent polymeric film layer. Most preferably, the direction of orientation of each polymeric film layer forms an angle of at least about 60 degrees with the direction of orientation of each adjacent polymeric film layer.

In general, the polymeric film layers can be made from any polymeric material which is capable of either being highly oriented or being prepared in an highly oriented state, such that each polymeric film exhibits dead bend characteristics with respect to bending deformations substantially normal to the direction of orientation.

As a practical matter, based on current technology, the preferred polymeric materials are thermoplastic polymers. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenyleneisopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxy-methylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as acrylonitrilebutadiene-styrene (ABS) copolymers, and the like; and the like.

The preferred thermoplastic polymers are polyolefins, with polyethylene being most preferred.

When thermoplastic polymers are being utilized, the multilayer polymeric film of the present invention having dead bend characteristics which are substantially planar isotropic preferably is made by the method which comprises the steps:

A. forming a first polymeric film from a first thermoplastic polymer;

B. uniaxially orienting said first polymeric film by stretching the film to a draw ratio of at least about 20;

C. forming a second polymeric film from a second thermoplastic polymer;

D. uniaxially orienting said second polymeric film by stretching the film to a draw ratio of at least about 20; and E. laminating said uniaxially oriented first polymeric film to said uniaxially oriented second polymeric film with the direction of orientation of said uniaxially oriented first polymeric film forming an angle of at least about 30 degrees with the direction of orientation of said uniaxially oriented second polymeric film to give a multilayer polymeric film having dead bend characteristics which are substantially planar isotropic.

Preferably, the direction of orientation of said uniaxially oriented first polymeric film forms an angle of at least about 45 degrees with the direction of orientation of said uniaxially oriented second polymeric film. Most preferably, the direction of orientation of said uniaxially oriented first polymeric film forms an angle of at least about 60 degrees with the direction of orientation of said uniaxially oriented second polymeric film.

As already noted, the preferred thermoplastic polymers are polyolefins, and the preferred polyolefin is polyethylene.

In order to obtain a sufficiently high degree of orientation in any given polymeric film, such that the film exhibits dead bend characteristics when deformed substantially normal to the direction of orientation, the draw ratio for each of steps B and D should be at least about 20. Preferably, the draw ratio will be at least about 25.

The method employed for stretching a polymeric film for use in the present invention is not known to be critical. Indeed, various methods are known to those having ordinary skill in the art.

Also known to those having ordinary skill in the art are methods of laminating polymeric films together. Of course, the laminating method should not significantly adversely affect the orientation of the polymeric film layers making up the multilayer polymeric film of the present invention or introduce a tendency for said multilayer polymeric film to recover from compressive or bending deformations. By way of illustration only, lamination can be accomplished by placing a nonwoven web or a film of a polymeric material having a melting point lower than that of either of the two film layers to be laminated together between said two layers and heating the multilayered structure under pressure to cause the middle web or film to melt and bond the two outer layers together. Alternatively, an adhesive can be spread or coated on one side of one of the film layers which is then joined to the second film layer. Other methods, of course, are known to those having ordinary skill in the art.

EXAMPLES

The present invention is further described by the examples which follow. Such examples, however, are not to be construed as limiting in any way either the spirit or the scope of the present invention. In the examples, all temperatures are in degrees Celsius and all parts and percentages are parts and percentages by weight unless stated otherwise. Polymer properties are those supplied by the manufacturer. Polymer density typically is determined in accordance with ASTM Method D 1505 and melt index in accordance with ASTM Method D 1238.

Test Procedures for Dead Bend Characteristics

In order to measure the degree of dead bend in either a polymeric film or the multilayer polymeric film of the present invention, the following test procedure was employed (referred to hereinafter as "Recovery Test Procedure"):

1. A narrow strip was cut from the film to be tested; the strip typically was about 0.6 cm wide and about 5 cm long.

Figure 1:
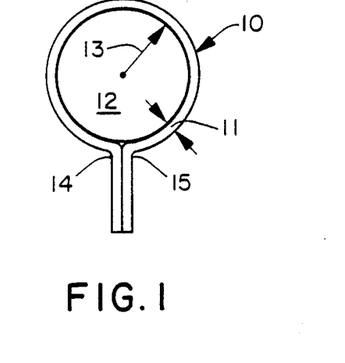
FIG. 1 illustrates a film strip sample wrapped around a mandrel in the Recovery Test Procedure described in the Examples.

2. The strip was wrapped around various mandrels or cylindrical rods having different diameters as shown by FIG. 1; typical mandrel diameters were 1 mm and 0.5 mm. Referring now to FIG. 1, a strip 10 having a thickness 11 was fitted as snugly as possible around a mandrel 12 having a radius 13. In order to get good conformance of strip 10 to mandrel 12, the strip was pinched together at points 14 and 15.

Figure 2:
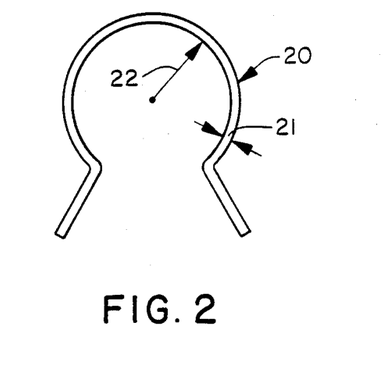
FIG. 2 illustrates a relaxed film strip after having been wrapped around a mandrel in the Recovery Test Procedure.

3. The strip was released and allowed to relax or recover. A relaxed strip is illustrated in FIG. 2; for simplicity, the mandrel is not shown. Relaxed strip 20 having a thickness 21 formed an open cylinder having a radius 22.

4. The diameter of the open cylinder formed by the relaxed strip was measured (sometimes referred to hereinafter as "relaxed diameter" or "diameter of the relaxed strip").

5. A recovery value was calculated for each strip and the values obtained for a given film were averaged.

The calculation of recovery, typically expressed as a percentage, was based on equation (10).

$$R = |(E_{io} - E_{ia})/E_{io}|, \text{ where} \quad (10)$$

$R$ is the recovery, $E_{io}$ is the strain imposed, and $E_{ia}$ is the strain imparted.

Because $$E_{io} = (t/2)/r_1 \text{ and} \quad (11)$$

$$E_{ia} = (t/2)/r_2, \text{ where} \quad (12)$$

$t$ is the thickness of the film sample, $r_1$ is the bending radius, and $r_2$ is the relaxed radius.

equation (10) becomes $$R = |r_1/(r_1 - r_2)|. \quad (13)$$

To express recovery as a percentage, it is only necessary to multiply the value obtained from equation (13) by 100.

It should be noted that each of the bending radius and the relaxed radius (the radius of the open cylinder formed by the relaxed or recovered strip) theoretically includes one-half of the film thickness to give what in effect is an average radius based on an average film thickness. Thus, one-half of the film thickness should be added to $r_1$ in the numerator of equation (13):

$$\begin{aligned} R &= |(r_1 + 0.5t)/[(r_1 + 0.5t) - (r_2 + 0.5t)]| \\ &= |(r_1 + 0.5t)/(r_1 + 0.5t - r_2 - 0.5t)| \\ &= |(r_1 + 0.5t)/(r_1 - r_2)| \end{aligned} \quad (14)$$

However, the thickness of the film strip was ignored in calculating recovery. Because the average thickness of the film is a small value, usually significantly less than 50 microns, relative to the radii, the error thus introduced is smaller than the experimental error resulting from measuring the diameter of the relaxed strip.

It was found that recovery values calculated by means of the above procedure were difficult to correlate in detail with either draw ratio or forced strain. Consequently, the test procedure was modified in an effort to obtain better correlation and more consistent results. In the modified procedure, the measurement of a small diameter was replaced with the measurement of an angle. Since yield strain was calculated instead of recovery, the values obtained were essentially independent of the radius of the mandrel.

The steps in the modified test procedure (referred to hereinafter as "Yield Strain Test Procedure") were as follows:

1. A narrow strip was cut from the film to be tested; the strip typically was about 0.6 cm wide and about 5 cm long.

Figure 3:
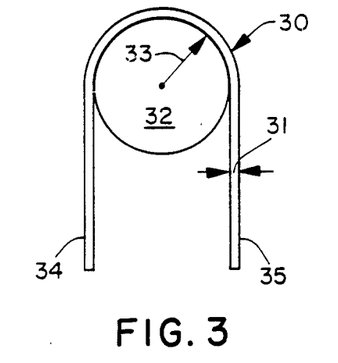
FIG. 3 illustrates a film strip sample bent around a mandrel in the Yield Strain Test Procedure described in the Examples.

2. The strip was bent gently around a mandrel of known diameter until the ends of the strip were parallel as illustrated by FIG. 3. In FIG. 3, test strip 30 having thickness 31 is bent around a mandrel 32 having a radius 33 until the ends 34 and 35 of the strip 30 are parallel.

Figure 4:
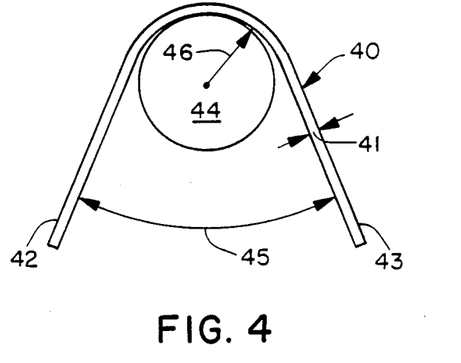
FIG. 4 illustrates a relaxed film strip sample after having been bent around a mandrel in the Yield Strain Test Procedure.

3. The strip was released and allowed to relax or recover. A relaxed strip is illustrated in FIG. 4. Relaxed strip 40 having a thickness 41 and ends 42 and 43 rests upon mandrel 44. Ends 42 and 43 have moved from a parallel relationship to form an angle 45. The curved portion of the relaxed strip circumscribes a circle having radius 46 (referred to hereinafter as "relaxed radius").

4. The angle 45 as shown in FIG. 4 was measured.

5. The yield strain was calculated from the value in radians of angle 45 of FIG. 4.

In order to calculate yield strain, a series of calculations was required. First, $\phi$ was calculated from equation (15):

$$\phi = R_b/R_f = 1 - \alpha/\pi, \text{ where} \tag{15}$$

$R_b$ is the bending radius, $R_f$ is the relaxed radius, and $\alpha$ is angle 45 as shown in FIG. 4.

Next, $\theta$ was calculated in accordance with equation (16):

$$\theta = \tfrac{1}{3}\tan^{-1}\{[\phi(1-\phi)-\tfrac{1}{4}]/(\phi-\tfrac{1}{2})\} \tag{16}$$

T then was calculated by means of equation (17):

$$T = \tfrac{1}{2}[1 - (\text{sgn } \theta)(\cos \theta) + (3)^{-\tfrac{1}{2}}(\sin \theta)], \tag{17}$$

where sgn $\theta$ is 1 when $\theta > 0$ and $-1$ when $\theta < 0$.

Finally, equation (18) was used to calculate the yield strain, $E_y$:

$$E_y = (T)^2(t)/(2R_b). \tag{18}$$

EXAMPLE 1

A high density polyethylene (Alathon 7040, E. I. duPont de Nemours and Company, Wilmington, Del.) having a melt index of 6.0 g/10 minutes and a density of 0.960 g/cc was extruded as a film having a width of about 102 cm and a thickness of about 0.36 mm using conventional equipment consisting essentially of a Hexco extruder having an 8.9cm diameter barrel, an all-purpose mixing screw, and a length-to-diameter ratio of 24 (Hexco, Inc., Addison, Ill.). The die was a 91cm wide coathanger manifold, standard sheet die (Extrusion Dies, Inc., Chippewa Falls, Wisc.). The chill roll and take-away system consisted of a 50.8-cm outer diameter, 91-cm wide roll with a matte finish, water cooled or heated. The winder was a Model 191-W winder and take-away system manufactured by Gloucester Engineering Co., Gloucester, Mass. The extrusion temperature was about 180 degrees and the chill roll temperature was about 95 degrees. Drawdown was minimal and the resulting film was essentially unoriented. The film was slit in the extrusion direction to produce about 2.5cm wide strips.

Figure 5:
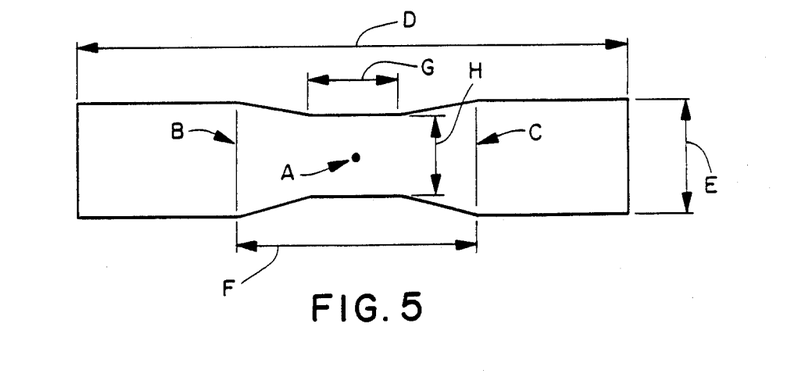
FIG. 5 illustrates the shape and identifies the dimension parameters of a film strip sample which is to be oriented by drawing in an Instron Testing Machine as described in the Examples.

The film was oriented by drawing on a Model 1122 Instron Testing Machine equipped with a Model 3111 Environmental Chamber (forced-air-heated oven) (Instron Corporation, Canton, Mass.). Asbestos-faced, pneumatic jaws were employed to avoid sample damage or slippage. The orientation or drawing procedure was as follows:

1. Triplicate film samples were cut from the strips as shown by FIG. 5. The thickness of each film sample at the center (point A of FIG. 5) was measured. The test section of each film sample (the portion of the film sample lying between lines B and C of FIG. 5) then was stamped with a rubber stamp having a grid consisting of a series of parallel lines spaced 1 mm apart; the lines were perpendicular to the longest axis of the sample and, consequently, perpendicular to the direction of draw. The dimensions of each sample, identified by the letters D-H, inclusive, of FIG. 5, are given in Table 1.

TABLE 1

| Dimensions of Instron Test Samples | |
|---|---|
| Dimension | Value (cm) |
| D | 12.7 |
| E | 2.5 |
| F | 5.1 |
| G | 1.9 |
| H | 1.9 |

2. Each sample was mounted in the Instron with the jaws gripping the sample from the ends to the lines B and C of FIG. 5. The sample was allowed to equilibrate for two minutes at the environmental chamber temperature. Samples were drawn to a draw ratio of about 10 at a temperature of 75 degrees and a 300 percent per minute strain rate.

3. Each sample was removed from the Instron and a new sample cut from the middle portion of the drawn strip. The new sample length was about 12.7 cm and the width was the drawn width. Drawn samples were redrawn to various draw ratios under essentially the same conditions. Final draw ratios were estimated by measuring the distances between the grid lines stamped onto the sample prior to the first drawing.

The percent recovery then was determined for each sample by the Recovery Test Procedure. The averaged results are summarized in Table 2.

TABLE 2

| Recovery Values for Samples from Example 1 | | | | |
|---|---|---|---|---|
| Sample No. | Draw Ratio | % Strain Imposed | % Strain Imparted | Percent Recovery |
| 1 | 20 | 4.0 | 3.2 | 20 |
| 2 | 28 | 4.2 | 3.4 | 18 |
| 3 | 41 | 4.9 | 4.4 | 11 |
| 4 | 45 | 5.6 | 5.1 | 9 |
| 5 | 20 | 5.6 | 4.0 | 38 |
| 6 | 32 | 4.4 | 2.7 | 38 |
| 7 | 41 | 4.3 | 2.8 | 34 |
| 8 | 45 | 4.0 | 2.8 | 30 |

All of the eight samples summarized in Table 2 exhibited dead bend characteristics with respect to deformations substantially normal to the direction of drawing or orientation, with the degree of dead bend being generally inversely proportional to the percent recovery.

Aluminum foil having a thickness of 0.018 mm typically has recovery values of no more than about 10 percent at an imposed strain of about 0.2 percent. However, as seen from the data of Table 2, dead bend characteristics are exhibited by a plastic film having a recovery of no more than about 20 percent at an imposed strain of about 5 percent or less. It is apparent, though, that the dead bend characteristics of the plastic films prepared in Example 1 are not equivalent to the dead bend characteristics of aluminum foil. It perhaps should be observed at this point that a plastic film does not have to mimic the dead bend characteristics of aluminum foil to be useful as a food wrap. It is only necessary that the film have sufficient dead bend characteristics to be functionally useful.

EXAMPLE 2

The extrusion procedure of Example 1 was repeated, except that the high density polyethylene was Gulf 9634 (Gulf Oil Products, Houston, Tex.) having a melt index of 0.8 g/10 minutes and a density of 0.960 g/cc and the extrusion temperature was about 200 degrees. The resulting film had a thickness of about 0.25 mm. The film was slit into about 46-cm wide strips and wound onto rolls.

The strips of film were drawn on a conventional multiroll draw frame (Model D-7700 Longitudinal Stretcher, Marshall and Williams Company, Providence, R.I.). The hot roll was set at about 100 degrees. Throughput was about 9.1 m per minute in the first pass, which provided a draw ratio of about 5. The throughput in the second pass was about 1.5 m per minute. Some film slippage on the rolls was experienced which precluded an accurate assessment of draw ratio. However, thermal analysis data showed an increased peak melting temperature, indicating that the final draw ratio was around 25-30.

The drawn films exhibited a recovery of about 20 percent from a strain of about 5 percent imposed in the machine direction. Recovery values also were obtained with samples of undrawn film, slightly drawn film, and moderately drawn film. The recovery data are presented in Table 3.

TABLE 3

| Recovery Values for Samples from Example 2 | | | | |
|---|---|---|---|---|
| Sample No. | Draw Ratio[a] | % Strain Imposed | % Strain Imparted | Percent Recovery |
| 1 | 0 | 1.0 | 0.2 | 82 |
|   | 0 | 7.0 | 1.2 | 83 |
| 2 | 18 | 1.0 | 0.3 | 77 |
|   | 18 | 10.0 | 2.3 | 69 |
| 3 | 25 | 0.7 | 0.2 | 67 |
|   | 25 | 2.5 | 1.0 | 60 |
|   | 25 | 5.0 | 2.9 | 43 |
| 4 | 30 | 0.7 | 0.3 | 51 |
|   | 30 | 2.5 | 1.7 | 33 |
|   | 30 | 5.0 | 3.9 | 22 |

[a]Approximate draw ratio.

EXAMPLE 3

The extrusion procedure of Example 2 was repeated, except that the high density polyethylene was Petrothene LB924 (USI Chemicals Company, Cincinnati, Oh.) having a melt index of 0.70 g/10 minutes and a density of 0.959 g/cc and a vacuum knife was used to assist the film in uniformly contacting the chill roll. The resulting film had a width of about 71 cm and a thickness of about 0.13 mm.

The film was cut longitudinally in about 3.1-cm wide strips which were oriented to a draw ratio of 8 by means of a T. M. Long stretcher (T. M. Long, Long Branch, N.J.). The initial strain rate was 500 percent per and a temperature of 85 degrees was employed. The second drawing was carried out as described in part 2 of Example 1. The final draw ratio was about 30.

A number of multilayer polymeric films was prepared by sandwiching one layer of a meltblown linear low density polyethylene web having a basis weight of about 15 g/m² between two sheets or layers of the drawn film. In the multilayer polymeric films thus produced, the outer layers of films were oriented such that the directions of orientation of the two outer layers formed angles of 30, 45, 60, and 90 degrees, respectively. The multilayer polymeric films were calendered between two slowly rotating, 46-cm diameter, heated steel rolls set at 130 degrees and exerting a pressure of about 50 pounds per lineal inch (about 8.9 kg per lineal cm).

The resulting multilayer polymeric films were transparent and those having an angle of orientation of at least 30 degrees exhibited dead bend characteristics sufficient for a food wrap; that is, such multilayer polymeric films showed about 20-40 percent recovery with about 5 percent imposed strain when tested in accordance with the Recovery Test Procedure. The dead bend behavior was substantially planar isotropic and the multilayer polymeric films showed a greatly reduced tendency to split relative to a single layer of the film used to prepare the multilayer films. The average results from five replicates per sample are summarized in Table 4.

TABLE 4

Summary of Results of Dead Bend Behavior of Two-Layer Films Having Varying Degrees of Orientation

| Orientation Angle (°) | Percent Recovery at 5% Strain[a] |
|---|---|
| — | 43[b] |
| 30 | 38 ± 7 |
| 45 | 29 ± 6 |
| 60 | 23 ± 10 |
| 90 | 40 ± 7 |

[a]Percent recovery ± one standard deviation.
[b]Percent recovery of a single film.

It is evident from Table 4 that all of the multilayer films had average recovery values which were less than that of a single layer of film, but that sample-to-sample variation for any given film was relatively high. This variation probably was caused by the presence of small air bubbles between the layers. If the laminating process were optimized, it is expected that both the percent recovery value and the standard deviation would decrease. Interestingly, the minimum percent recovery was observed at a 60 degree orientation.

As extensions of the procedures described in Examples 1-3, inclusive, additional extrusion experiments were carried out. These experiments involved both cast films and blown films.

EXAMPLE 4

The objectives of the experiments described in this example were:

(a) to compare the drawability of a linear low density polyethylene with that of the best available high density polyethylene;

(b) to examine the influence of quench temperature on film drawability;

(c) to examine the effect of film thickness on processability into thin, highly oriented film;

(d) to determine whether or not the presence of low molecular weight polymer fractions in the melt facilitated the subsequent orientation of the resulting film; and (e) to determine whether or not high density polyethylene can be coextruded with low density polyethylene so that the latter could serve as an in-place adhesive for the subsequent lamination of two highly oriented films of high density polyethylene.

Twelve substantially unoriented films were prepared using the chill roll casting technique. The equipment consisted of a Hexco extruder having an 8.9-cm diameter barrel, an all-purpose mixing screw, and a length-to-diameter ratio of 24 (Hexco, Inc., Addison, Ill.). The die was a 91cm wide coathanger manifold, standard sheet die (Extrusion Dies, Inc., Chippewa Falls, Wis.). The chill roll and take-away system consisted of a 50.8-cm outer diameter, 91-cm wide roll with a matte finish, water cooled or heated. The winder was a Model 191-W winder and take-away system manufactured by Gloucester Engineering Co., Gloucester, Mass. The films prepared are summarized in Table 5 and the principal processing parameters are summarized in Table 6.

TABLE 5
Summary of Cast Films

| Film No. | Thickness (microns) | Polymer Type |
|---|---|---|
| 1 | 102 | Dowlex 2035[a] |
| 2 | 178 | Dowlex 2035 |
| 3 | 102 | Dowlex 2035 |
| 4 | 178 | Petrothene LB924 |
| 5 | 152 | Petrothene LB924 |
| 6 | 127 | Petrothene LB924 |
| 7 | 102 | Petrothene LB924 |
| 8 | — | 95% Petrothene LB924 5% Petrothene NA601[b] |
| 9 | 178 | Petrothene LB924 |
| 10 | 102 | Petrothene LB924 |
| 11 | 216 | Petrothene LB924 and Norchem 3404[c] |
| 12 | 216 | Petrothene LB924 and Norchem 3404[c] |

[a]A linear low density polyethylene having a density of 0.919 g/cc and a melt index of 6.0 g/10 minutes (Dow Chemical Company, Midland Michigan).
[b]A low density, low molecular weight polyethylene having a density of 0.903 g/cc and a melt index of 2.000 g/10 minutes; the number average molecular weight, weight average molecular weight, Z average molecular weight, and polydispersity are reported to be 4,600, 22,400, 83,300, and 4.87, respectively (USI Chemicals Company, Cincinnati, Ohio).
[c]A low density polyethylene having a density of 0.922 g/cc and a melt index of 1.8 g/10 minutes (Norchem, Inc., Rolling Meadows, Illinois); the polymers were coextruded to give a bilayer film.

TABLE 6
Summary of Processing Parameters for Preparation of Cast Films

| Film No. | Extruder Screw RPM | Extruder Pressure (psig) | Chill Roll Temp. (°) |
|---|---|---|---|
| 1 | 20 | 2,600 | 93 |
| 2 | 20 | 2,600 | 93 |
| 3 | 20 | 2,600 | 16 |
| 4 | 30 | 2,600 | 93 |
| 5 | 30 | 2,600 | 93 |
| 6 | 30 | 2,600 | 93 |
| 7 | 30 | 2,600 | 93 |
| 8 | 30 | 3,000 | 93 |
| 9 | 30 | — | 27 |
| 10 | 30 | — | 21 |
| 11 | 36[a] | 2,600[a] | 93 |
|  | 15[b] | 1,500[b] | 93 |
| 12 | 36[a] | 2,600[a] | 93 |
|  | 15[b] | 1,500[b] | 93 |

[a]Parameters for the Petrothene LB924.
[b]Parameters for the Norchem 3404.

Samples from film number 5 were drawn at a variety of different temperatures as described in Example 1, except that the crosshead speed for the first draw was 12.7 cm/minute and the crosshead speed for the second draw was 5.1 cm/minute. Replicate drawings were conducted in groups of at least three. One group of samples was drawn in the machine direction (MD) and one group was drawn in the cross direction (CD) at each temperature. The results from each group were averaged. Both drawings of each sample were conducted at the same temperature which varied from 75 to 115 degrees (i.e., chamber temperature). The results are summarized in Table 7.

TABLE 7
Summary of Average Results of Drawings at Different Temperatures

| Chamber Temp. (°) | Final MD Draw Ratio | Final CD Draw Ratio |
|---|---|---|
| 75 | 18 | 20 |
| 85 | 22 | 24 |
| 90 | 22 | 27 |
| 95 | 20 | 24 |
| 105 | 18 | 20 |
| 115 | 17 | 20 |

Based on the results shown in Table 7, the optimum drawing temperature for the film examined, i.e., Petrothene LB924, was determined to be 90 degrees under the test conditions employed. The slightly greater draw ratios which were achieved in the cross direction suggest that the film was slightly oriented in the machine direction during the extrusion process. Consequently, the values reported in Table 7 for the machine direction draw rates probably are low by roughly 10–20 percent because of the unintended orientation.

In order to determine the optimum drawing rates for both drawing stages, the above procedure was repeated with samples of the same film, except that the chamber temperature was maintained at a constant 90 degrees and the draw rates in both stages were varied. The average total draw ratio of four replicates for each combination of drawing rates is summarized in Table 8.

TABLE 8
Summary of Average Total Draw Ratio from Varying Draw Rate Study

| Second Draw Rate | First Draw Rate | | |
|---|---|---|---|
|  | 12.7 cm/min. | 5.1 cm/min. | 2.5 cm/min. |
| 12.7 cm/min. | 23[a] | 22 | 20 |
| 5.1 cm/min. | 21 | 20 | 18 |
| 2.5 cm/min. | 20 | 19 | 18 |

[a]Crazing in the samples occurred during the second draw.

While significant differences were not observed upon varying the draw rates as indicated, it appears that the optimum rates for the two drawing stages are 12.7 cm/minute and 5.1 cm/minute. Although there may be a slight advantage in using the slower draw rate in the first drawing stage, it was decided to standardize the two-stage drawing procedure with the slower draw rate in the second drawing stage as is commonly practiced by those having ordinary skill in the film drawing art.

The effect of chill roll temperature on maximum draw ratios obtainable is seen from Table 9. The data were obtained under the optimum temperature and drawing conditions already described; in each case, the value reported is the average of three replicates.

TABLE 9

Summary of the Effect of Chill Roll
Temperature on Total Draw Ratio

| Film No. | Chill Roll Temp. (°) | Final MD Draw Ratio | Final CD Draw Ratio |
|---|---|---|---|
| 4 | 93 | 22 | 27 |
| 9 | 27 | 22 | 25 |

Differences in chill roll temperatures do not appear to have a significant effect on the maximum draw ratio obtainable, at least with film made from Petrothene LB924.

Finally, drawings of films other than one made from Petrothene LB924 were carried out under the conditions already described. The average results of two or three replicates are summarized in Table 10.

TABLE 10

Summary of Drawing Results with Other Films

| Film No. | Final MD Draw Ratio | Final CD Draw Ratio |
|---|---|---|
| 2 | 11 | 11 |
| 8 | 17 | 22 |
| 11 | 14[a] | 11[a] |

[a]The drawing procedure was not completed because the low density polyethylene layer began separating from the high density polyethylene layer.

It will be recalled from Table 5 that film number 2 was made from a linear low density polyethylene (Dowlex 2035), film number 8 was made from a blend consisting of 95 percent of a high density polyethylene (Petrothene LB924) and 5 percent of a low density, low molecular weight polyethylene (Petrothene NA601), and film number 11 was a coextruded, bilayer film, one layer having been extruded from Petrothene LB924 and the other layer having been extruded from Norchem 3404.

The data in Table 10 suggest that:

(1) the optimum drawing conditions for a film made from a high density polyethylene are not equally applicable to a film made from a linear low density polyethylene;

(2) the presence of a low molecular weight fraction in a high density polyethylene did not enhance the drawability of the film and apparently reduced drawability by 10–20 percent;

(3) while the bilayer approach was not successful, as expected, it still may represent a viable alternative if the extensibilities of the two layers can be more closely matched or drawing conditions altered to overcome the tendency of the layers to separate upon drawing; and (4) because of a lack of sufficient time to optimize drawing conditions, better results may be possible.

In view of the results obtained from the experiments described in Example 4, further studies were conducted solely with Petrothene LB924.

EXAMPLE 5

Film number 9 of Example 4 was drawn once on the conventional multiroll draw frame described in Example 2. The hot roll was set at about 100 degrees. The draw rate was 400 percent per minute which resulted in a draw ratio of 7. Attempts to carry out a second draw on the same equipment were unsuccessful. Consequently, the second stage drawing was accomplished on the Instron Testing Machine as described in Example 1. The second stage draw was carried out at various temperatures and various draw rates. Three to five replicates were run in each case, and the average results are summarized in Table 11. In the table, draw rate is expressed as percent strain per minute. Because the initial length of the sample between the jaws of the Instron was 5.1 cm, a strain rate of 100 percent per minute is equal to a draw rate of 5.1 cm per minute. Similarly, a strain rate of 250 percent per minute is equivalent to draw rate of 12.7 cm per minute, and so on.

TABLE 11

Summary of Second Stage Draw Ratios
Obtained at Varying Temperatures
and Varying Second Stage Strain Rates

| 2nd Stage Temp. (°) | 2nd Stage Draw Ratio at 2nd Stage Strain Rate | | | | | |
|---|---|---|---|---|---|---|
|  | 100 | 250 | 500 | 750 | 1000 | 1250 |
| 85 | 2.9 | 2.7 | 2.7 | 2.4 | 2.5 | 2.4 |
| 90 | 2.8 | 2.8 | 2.8 | 2.9 | 2.8 | 2.4 |
| 95 | 2.9 | 3.0 | 3.1 | 3.2 | 2.8 | 2.4 |
| 100 | 2.8 | 3.1 | 2.9 | 3.0 | 2.7 | 2.5 |
| 105 | 2.5 | 2.6 | 2.7 | 2.9 | 2.8 | 2.4 |
| 115 | 2.1 | 2.3 | 2.5 | 2.4 | 2.4 | 2.2 |
| 125 | 1.9 | 2.4 | 2.6 | 2.7 | 2.1 | — |

The conditions which produced the greatest second stage draw ratio at a constant first stage draw ratio of 7 were a second stage draw temperature in the range of 95 to 105 degrees and a second stage strain rate of 250 to 750 percent per minute.

EXAMPLE 6

Blown film was produced with a Type HS 65 R Alpine heavy duty blowing direction vertical upwards extruder (Alpine American Corporation, Natick, Mass.). The extruder screw, designed for extruding high density polyethylene, has a diameter of 65 mm and a length-to-diameter ratio of 19. The die head was an Alpine Type BK 8-20 oscillating head having a diameter of 120 mm and the air ring was an Alpine Type HK 200. A standard collapsing frame and an Alpine Type WSD winder were employed. The polymer from which film was prepared was Petrothene LB924 (see Example 3). The process parameters are summarized in Tables 12 and 13.

TABLE 12

Summary of Blown Film Process Parameters

| Film No. | Thickness (microns) | BUR[a] | Melt Temp. (°) | Barrel Press. (psig) |
|---|---|---|---|---|
| 1 | 51 | 2.3 | 177 | 4,700 |
| 2 | 38 | — | 177 | 4,700 |
| 3 | 38 | 4.5 | 184 | 4,670 |
| 4 | 76 | 1.5 | 178 | 2,850 |
| 5 | 89 | 2.8 | 177 | 4,000 |
| 6 | 89 | — | 350 | 4,000 |

[a]Blow-up ratio.

TABLE 13

Summary of Blown Film Process Parameters, Cont'd.

| Film No. | Line Speed (mpm) | Screw Speed (rpm) |
|---|---|---|
| 1 | 40 | 110 |
| 2 | 65 | 110 |
| 3 | 28 | 118 |
| 4 | 14 | 40 |
| 5 | 14 | 80 |
| 6 | 14 | 80 |

In each case, the die gap was 1.0 mm. The zone temperatures were as follows: zones 1–5, inclusive, were 171 degrees, zones 6 and 7 were 177 degrees, zone 8 was 182 degrees, and zone 9 was 188 degrees.

EXAMPLE 7

Experiments in orienting the cast and blown films prepared in Examples 4 and 6 were carried out on a small tenter. Although only limited success was achieved, the work is summarized here for the sake of completeness.

The tenter, located at the Marshall and Williams Company (Providence, R.I.), was approximately 12.2 meters long and equipped on each side with clips on endless chains sliding on glide rails, with a maximum separation of the two chains at the outlet end of 165 cm. Film heating was provided by an oven with hot air impinging on the film from both sides through conventionally spaced nozzles. The oven had three heating zones which were independently controllable.

As with the previous stretching experiments, a two-stage draw was planned. In the first stage, the film was to be drawn continuously to a draw ratio of 6 or 7. The film then would be cut into short strips and drawn again in the tenter to simulate machine direction drawing.

Process conditions for the first stage draw were as follows:

Gauge length: 23 cm
Draw ratio: 7
Stretch rate: 400 percent per minute
Line speed: 2.5 meters per minute
Film temperature: 95–100 degrees Under these conditions, cast film could be drawn only in the machine direction. When short lengths of film were placed in the tenter to be stretched in the machine direction, longitudinal splitting occurred if they were wider than about 18 cm. When tubular blown film was stretched in an attempt to overcome this width limitation, the tube edge creases became stiff and split when the tube was unfolded. It is believed that the drawing on rolls was unsuccessful because of lateral constraints arising from friction of the film on the roll in conjunction with the decrease in lateral strength. It should be possible to avoid this friction-induced problem by drawing the film in a fluid (either gas or liquid) instead of on rolls.

The tenter process conditions for the second stage draw were:

Gauge length: 79 cm
Sample width: 5.6 cm
Draw ratio: 2
Stretch rate: 70 percent per minute
Film temperature: 100–105 degrees In every case, the sample broke into two pieces without splitting longitudinally.

During these stretching experiments, the development of corrugations along the stretch direction was observed. The corrugations were more pronounced in thinner films and seemed to be uniform in wavelength and amplitude across the width of the film. The corrugations probably resulted from the sample gripping technique employed by the tenter.

In view of the difficulties encountered with the tenter, stretching experiments were continued on a line stretcher. The line stretcher consisted of an unwind station, three pairs of independent nip rolls, and a rewind station. Adjacent nips were spaced about 81 cm apart, measured from center line to center line. The film was threaded diagonally between the outlet roll of one nip and the inlet roll of the next nip so that the effective stretch zone was about 58 cm long. The first nip had an oil-heated roll which was used to preheat the film. To provide noncontact heating of the film, a pair of electrically heated parallel plates having an adjustable gap was fitted in the stretch zone between the first and second nips.

The gap between the electrically heated plates was set at about 9.5 mm; this was found to be the practical minimum in order to avoid having any portion of the film touch either plate. In combination with the heated nip roll, this arrangement worked well with films having a thickness of less than about 51 microns. Thicker films broke upon attempting to increase the draw ratio. As a matter of convenience, work on the line stretcher was confined to film having a thickness of 38 microns.

The heated nip roll was adjusted to a temperature of 105 degrees and the plates were heated at 110 degrees. These temperatures heated the film sufficiently to allow the effective use of the entire stretch zone between the heated plates and avoided forcing the stretching process onto the second nip roll which could have resulted in film splitting.

The draw ratio was adjusted by increasing the speed of the second nip relative to that of the first nip. Because of machine limitations, the maximum ratio obtainable was 6. In practice, the speed of the second nip was gradually increased until the maximum speed was reached or the film was stretching uniformly without splitting or breaking. The line speed was adjusted as high as possible without adversely affecting process performance. The draw ratio actually achieved was determined by measuring the spacing increase between grid marks stamped on the unstretched film. Starting film widths were approximately 10, 15, 20, 25, and 50 cm. Films which were drawn successfully in the first stage were subjected to second stage draw ratios of 2 to 4.

Although the 50-cm wide film could not be processed without splitting longitudinally, the processability of the other films improved with decreasing width. A width of no more than about 15 cm was required to achieve consistently good results in both stages. With the 15-cm wide film, the maximum second stage draw ratio sustainable was 2. To avoid splitting the film, the line speed had to be slowed to 0.9 meter per minute in and 5.2 meters per minute out in the first stage draw and about 0.6 meter per minute in and 1.2 meter per minute out in the second stage draw. After the second stage draw, the final film width was about 2.5 cm. Thus, at a total draw ratio of 11 or 12, the neck-in ratio was about 6. The corrugation problem mentioned earlier was observed with the 20-cm wide film, but not with the 15-cm wide film.

Having thus described the invention with particular reference to preferred embodiments, it will be obvious to those having ordinary skill in the art to which the invention pertains that numerous variations and changes can be made without departing from the spirit and scope of the invention a defined in the appended claims.

What is claimed is:

1. A method of making a multilayer polymeric film having dead bend characteristics which are substantially planar isotropic which comprises the steps of:
    A. forming a first polymeric film from a first thermoplastic polymer;
    B. uniaxially orienting said first polymeric film by stretching the film to a draw ratio of at least about 20;

C. forming a second polymeric film from a second thermoplastic polymer;

D. uniaxially orienting said second polymeric film by stretching the film to a draw ratio of at least about 20;

E. laminating said uniaxially oriented first polymeric film to said uniaxially oriented second polymeric film with the direction of orientation of said uniaxially oriented first polymeric film forming an angle of at least 30 degrees with the direction of orientation of said uniaxially oriented second polymeric film to give a multilayer polymeric film having dead bend characteristics which are substantially planar isotropic, wherein each polymeric film is composed substantially of polymer fibrils having an average length of at least about 5 micrometers and an average diameter of less than about 0.5 micrometers.

2. The method of claim 1, in which the draw ratio in each of steps B and D is at least about 25.

3. The method of claim 1, in which each of said first thermoplastic polymer and said second thermoplastic polymer is a polyolefin.

4. The method of claim 3, in which said polyolefin is polyethylene.

5. The method of claim 4 further comprising the step of providing a linear low density polyethylene material between said uniaxially oriented first polymeric film and said uniaxially oriented second polymeric film.

6. The method of claim 1, in which the direction of orientation of said uniaxially oriented first polymeric film forms an angle of at least about 45 degrees with the direction of orientation of said uniaxially oriented second polymeric film.

7. The method of claim 6, in which the draw ratio in each of steps B and D is at least about 25.

8. The method of claim 6, in which each of said first thermoplastic polymer and said second thermoplastic polymer is a polyolefin.

9. The method of claim 8, in which said polyolefin is polyethylene.

10. The method of claim 9 further comprising the step of providing a linear low density polyethylene material between said uniaxially oriented first polymeric film and said uniaxially oriented second polymeric film.

11. The method of claim 1, in which the direction of orientation of said uniaxially oriented first polymeric film forms an angle of at least about 60 degrees with the direction of orientation of said uniaxially oriented second polymeric film.

12. The method of claim 11, in which the draw ratio in each of steps B and D is at least about 25.

13. The method of claim 11, in which each of said first thermoplastic polymer and said second thermoplastic polymer is a polyolefin.

14. The method of claim 13, in which said polyolefin is polyethylene.

15. The method of claim 14 further comprising the step of providing a linear low density polyethylene material between said uniaxially oriented first polymeric film and said uniaxially oriented second polymeric film.

* * * * *

UNITED STATES PATENT AND TRADEMARK OFFICE
CERTIFICATE OF CORRECTION

PATENT NO. : 4,923,549

DATED : May 8, 1990

INVENTOR(S) : Steven B. Warner

It is certified that error appears in the above—identified patent and that said Letters Patent is hereby corrected as shown below:

Column 15, line 61, "per and" should read --per minute and--;

Column 20, line 33, "has" should read --had--;

Column 21, line 17, "twos-tage" should read --two-stage--; and

Column 22, line 58, "invention a" should read --invention as--.

Signed and Sealed this

Thirtieth Day of March, 1993

Attest:

STEPHEN G. KUNIN

*Attesting Officer*         *Acting Commissioner of Patents and Trademarks*